United States Patent [19]

Scow et al.

[11] 3,763,031

[45] Oct. 2, 1973

[54] RF SPUTTERING APPARATUS

[75] Inventors: Kenneth B. Scow; James W. Tuttle, both of Wappingers Falls, N.Y.

[73] Assignee: Cogar Corporation, Poughkeepsie, N.Y.

[22] Filed: Oct. 1, 1970

[21] Appl. No.: 77,105

[52] U.S. Cl. .............................................. 204/298
[51] Int. Cl. .......................................... C23c 15/00
[58] Field of Search ............................ 204/298, 192

[56] References Cited

UNITED STATES PATENTS

| | | | |
|---|---|---|---|
| 3,410,775 | 11/1968 | Vratny | 204/298 |
| 3,525,680 | 8/1970 | Davidse et al. | 204/298 |
| 3,458,426 | 7/1969 | Rausch et al. | 204/298 |

*Primary Examiner*—John H. Mack
*Assistant Examiner*—Sidney S. Kanter
*Attorney*—Harry M. Weiss

[57] ABSTRACT

An r. f. sputter coating apparatus includes an electrically isolated sputter shield surrounding the glow discharge region between anode and cathode. An r. f. signal may be applied to the shield to drive the glow discharge more positive with respect to anode potential. In addition, when sputtering conductive materials, a d. c. potential may be applied to the shield. When applying r. f. to the shield a variable inductance may be placed in parallel with the shield so as to form a parallel resonant circuit and maintain potential between shield and ground a maximum. A matching network is provided to assure maximum power transfer from the r.f. generator into the discharge. The network may include a vacuum capacitor formed within the dark space of the cathode on the cathode back side. Automatic electronic tuning of the matching network can be provided. A reactance tube variable network connected between the r. f. output and the matching network compensates for load circuit changes during sputtering. The shield may also be used to advantage in sputter etching equipment.

12 Claims, 8 Drawing Figures

PATENTED OCT 2 1973

3,763,031

SHEET 1 OF 2

INVENTORS
KENNETH B. SCOW
JAMES W. TUTTLE
BY Joseph L. Spiegel
Harry M. Weiss
ATTORNEYS

RF SPUTTERING APPARATUS

BACKGROUND OF THE INVENTION

1. Field of the Invention

This invention relates generally to coating apparatus and in particular to r. f. sputter coating apparatus used in depositing a layer of passivating material on the surfaces of semiconductive devices.

2. Description of the Prior Art

Semiconductive devices including resistors, diodes, transistors and integrated circuit devices, normally include a passivating layer of insulating material over a surface of their body. This film can be thermally grown or pyrolitically deposited. It might be a glass deposited through sedimentation procedures which is subsequently fused to the surface. Alternatively, as to be discussed herein the layer could be a dielectric material applied to the surface of the semiconductive body by sputtering.

In a typical sputtering apparatus, two electrodes, generally referred to as cathode and anode are spaced from one another within a low pressure gas ionization chamber. A target of dielectric material is mounted on or positioned adjacent to the cathode, while the devices to be coated are mounted on the anode in spaced parallel relationship to the target. An r. f. field is applied to the electrodes establishing a glow discharge therebetween. During the portion of the cycle when the cathode is negative, positive ions from the discharge are accelerated toward the cathode so that they bombard the target with sufficient impact to eject atomic particles therefrom. These ejected or sputtered particles of target material are deposited on the devices mounted on the nearby anode electrode to thus form a passivating layer thereon.

One of the problems associated with coating semiconductive devices with a passivating layer by sputtering is protection of the metal lines which function as electrical interconnectors. These lands are not planar with respect to the surface of the semiconductor and flaws develop at the edges of these lines as the sputtered material is deposited, leaving the lines exposed and therefore unprotected against the ambient or against attack during a subsequent etching step.

Solutions to this problem have generally revolved about the resputtering of some of the material off the device at some rate less than the deposition rate such that the flaw in effect heals itself.

In the past this resputtering has been effected by controlling the cathode/anode ratio geometrically, by applying a magnetic field to enhance ionization in effect controlling the cathode/anode ratio or by tuning the anode.

Where the cathode/anode ratio has been controlled geometrically the mechanical structure required to isolate the plasma is extremely complicated. Where enhanced ionization has been achieved through magnetic means, it has proved to be difficult to optimize operating parameters and closely control same. Finally, the low capacitance requirements of a tuned anode system make mechanical construction of the apparatus difficult.

SUMMARY OF THE INVENTION

An object of the invention is an improved r. f. sputter apparatus.

Another object is such an apparatus which is simple in structure and easily controlled.

Still another object is maximum power transfer from the r. f. generator of an r. f. sputter apparatus to the discharge.

A further object is automatic, electronic tuning of the matching network.

These and other objects are accomplished in accordance with the teachings of the present one illustrative embodiment of which comprises providing in a diode sputtering apparatus a sputter shield which surrounds the ionization plasma region between the anode and cathode. The shield is allowed to float by isolating it electrically from the anode, cathode and walls of the apparatus. This isolation of the shield reduces the effective anode area and drives the plasma more positive with respect to the anode, allowing, when the apparatus is used for coating, resputtering from and subsequent rehealing of the surface being coated. A further advantage of this arrangement is that sputtering of dielectric material onto the walls of the apparatus is eliminated. The shield itself is easily removed and cleaned requiring a minimum of machine down time. Also, in the past, some arcing and sparking between the walls of the apparatus and the plasma has been noted. The provision of a floating potential shield completely eliminates this arcing and sparking.

In accordance with further teachings of our invention, an r. f. signal is applied to the sputter shield. This application of an r. f. signal forms a dark space around the shield and d. c. grounds same. The plasma is driven more positive with respect to the shield and also the anode, to provide enhanced results.

In accordance with another aspect of our invention, a variable inductance is placed in parallel with the shield so as to form a parallel resonant circuit and keep the impedance between shield and ground a maximum.

Normally, an r. f. sputter apparatus includes a matching network between r. f. generator and cathode to assure maximum power transfer from the r. f. generator into the discharge. In accordance with further teachings of our invention, this matching network includes a vacuum capacitor formed within the dark space on the cathode back side.

A reactance tube variable network may be placed in parallel between the r. f. input and matching network to compensate for load circuit changes during sputtering and provide an automatic, electronic tuning feature.

When sputtering conductive metals, a d. c. potential can be applied to the shield and in the same manner effect control of the plasma.

The teachings of the present invention can also be used to advantage in r. f. sputter etching equipment. In that case the devices to be etched are mounted at the cathode. Less sparking and arcing and more uniform results can be expected.

BRIEF DESCRIPTION OF THE DRAWING

The foregoing and other objects, features and advantages of the invention will be apparent from the following more particular description of the preferred embodiments of the invention as illustrated in the accompanying drawing, wherein.

DESCRIPTION OF THE PREFERRED EMBODIMENTS

The teachings of the present invention are applicable to r. f. sputter apparatus, including both sputter coating apparatus and sputter etching apparatus. In addition, when used in sputter coating apparatus, the teachings are applicable both to sputtering of dielectric as well as conductive material. The teachings are preferably used in apparatus for sputter coating dielectric materials and the ensuing discussion will center on that application, although it is to be understood that the teachings are applicable to the other type apparatus.

Figure 1:
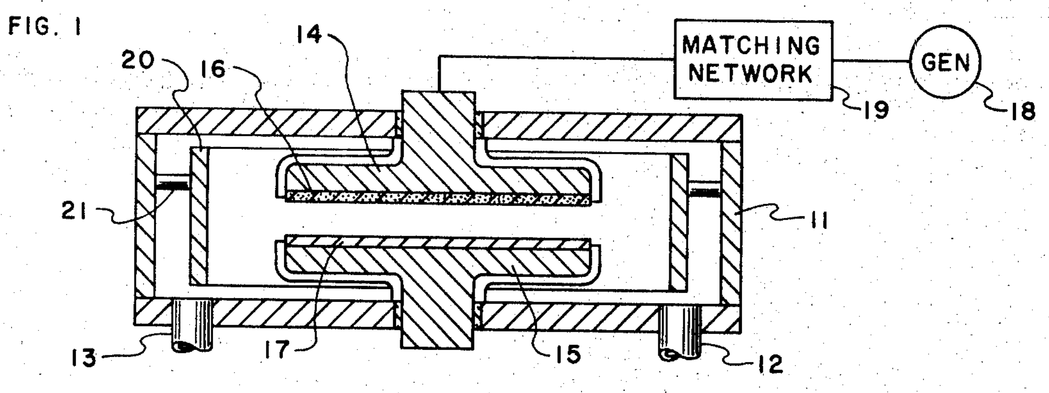
FIG. 1 is a cross-sectional, schematic view of an r. f. sputtering apparatus including the novel sputter shield of the present invention.

Referring now to FIG. 1 of the drawing, an exemplary sputter coating apparatus, in which the teachings of the present are incorporated, is shown as including an evacuable chamber 11 formed by a stainless steel cylindrical outer wall. A suitable ionizable medium such as argon gas supplied by a source 12 is maintained at a desired low pressure, typically 1–100 microns in the chamber by means of a vacuum pump 13.

Within the chamber are positioned a cathode structure 14 and an anode structure 15. A target 16 consisting of the dielectric material to be sputtered, typically quartz, 21 inches in diameter, or some other type dielectric material such as aluminum oxide, silicon nitride, etc., is mounted on the cathode structure, while the objects to be coated, typically semiconductuve wafers, say 37, are mounted at 17 in suitable holders secured to the anode in spaced parallel relationship to the target. The distance separating the wafers from the target is typically one inch.

In operation, an r. f. signal, typically 4–7 kilowatts at 13.56 MHZ, is applied to the cathode 14 through an r. f. generator 18 and matching network 19. During the half cycles, when the potential of the cathode is negative with respect to ground, positive ions from the plasma created between cathode and anode are accelerated toward the cathode so as to eject particles from the target. These sputtered particles will be deposited upon the wafers until a desired thickness of material, typically 3.0 microns is achieved.

As noted previously, these wafers normally include metallic lines on their surface. As the material is deposited, flaws develop at the edges of these lines leaving the lines exposed and therefore unprotected.

To overcome this problem, and in accordance with the teachings of the present invention, there is provided a sputter shield 20, as of stainless steel, insulated from the cylindrical outer wall by means of steatite insulators 21, which surrounds the ionization plasma between the anode and cathode. Since the shield is isolated electrically its potential floats. The presence of this floating potential electrode of high voltage but no current reduces the effective anode area and drives the plasma more positive with respect to anode, allowing resputtering from and subsequent rehealing of the surfaces of the wafers being coated. The voltage on the shield is thus seen to be related to or determined by the low potential which enhances deposited film properties.

A further advantage of this arrangement is that sputtering of dielectric material onto the outer wall 11 is eliminated. The shield itself can easily be removed and cleaned requiring a minimum of apparatus down time.

It has also been observed that any arcing or sparking from the plasma between it and the wall of the apparatus is eliminated.

The apparatus, with the inclusion of the floating potential shield, is extremely stable, running as low as 200 watts with excellent control.

Figure 2:
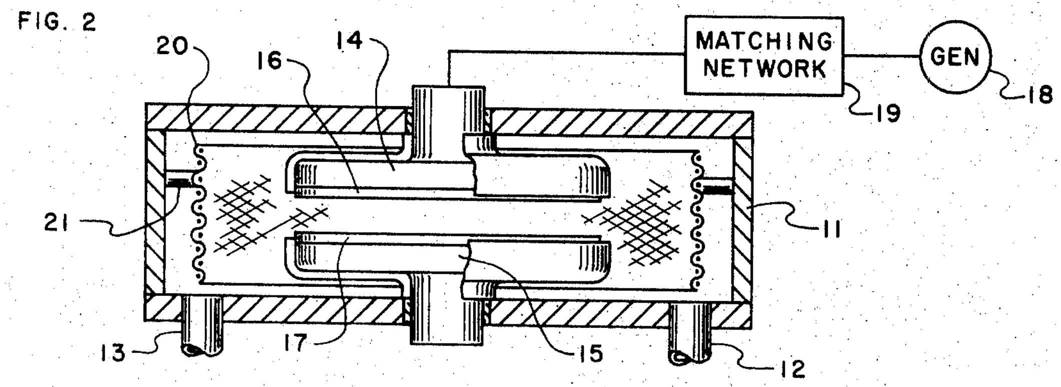
FIG. 2 is an enlarged sectional view, partially broken away of an alternate sputter shield showing the shield to be apertured.

The shield need not be solid. For example, as shown in FIG. 2 the shield 20 can be apertured, with perforations on the order of ⅛ inch diameter nor does the shield have to be metallic. For example, the material can be quartz.

Figure 3:
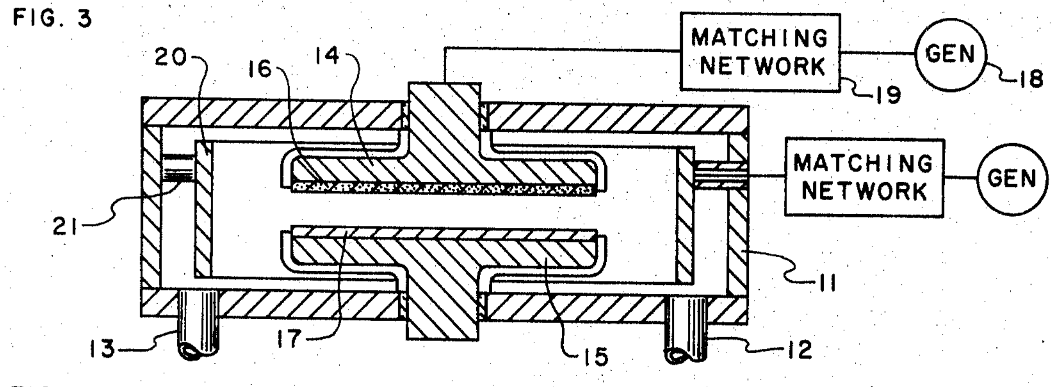
FIG. 3 is similar to FIG. 1, but with generator means for applying an r. f. signal to the shield included.

Referring now to FIG. 3, in accordance with further teachings of our invention a further embodiment is illustrated. FIG. 3 is similar to FIG. 1, except for the inclusion of a generator 22 connected to the shield. When sputtering dielectric material this generator is an r. f. generator. In operation, an r. f. signal, typically 250 watts, is applied to the shield. A dark space is formed around the shield and d. c. grounds same. The plasma is driven more positive with respect to the shield and also the anode to enhance resputtering and healing of devices positioned on the anode.

Figure 4:
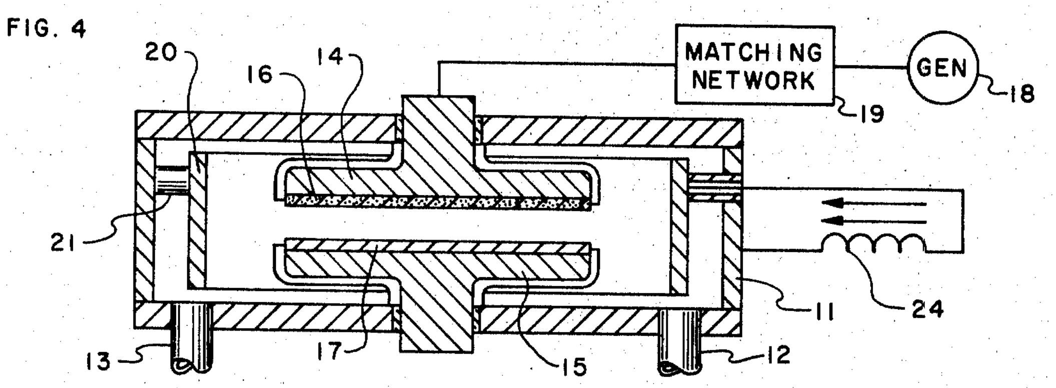
FIG. 4 is similar to FIG. 3, but with a variable inductance placed in parallel with the shield.

The shield acts as a capacitance between the walls of the apparatus and the plasma. In accordance with another aspect of the invention and with reference to FIG. 4, a variable inductor 24 is placed in parallel with the shield so as to form a parallel resonant circuit. In this way the impedance between shield and ground can be kept at a maximum, thus assuring that shield potential hence plasma potential is maximum with respect to anode potential.

Figure 5:
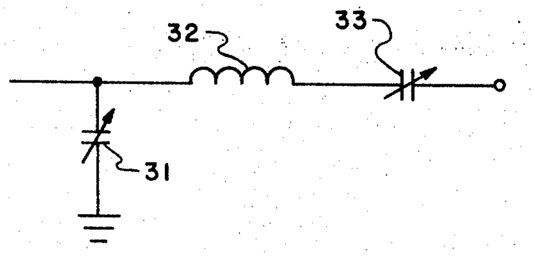
FIG. 5 illustrates, schematically, the prior art matching network of an r. f. coating apparatus.

To assure maximum power transfer from the r. f. generator into the discharge, presently available r. f. sputtering apparatus include a matching network between generator and cathode. As shown in FIG. 5, this network typically includes a variable shunt capacitance 31 and a series connected inductance 32 and variable capacitance 33.

Figure 6:
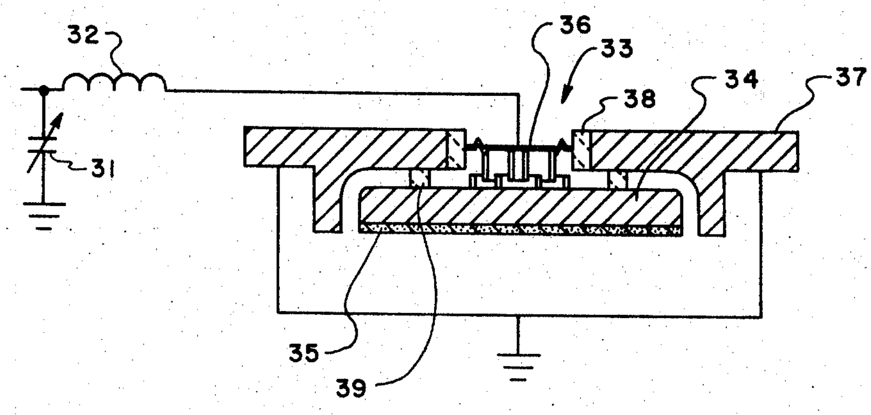
FIG. 6 illustrates, schematically, the novel matching network of the present invention in which the series capacitance is formed within the dark space of the cathode and on its back side.

In accordance with another aspect of our invention, and with reference to FIG. 6, there is shown a portion of an r. f. sputtering apparatus in which the external series capacitance of the matching network is replaced by a vacuum capacitor 33 formed within the dark space of the cathode 34. This capacitor is formed on the back surface of the cathode 34 between the cathode back surface 35 and a metal diaphragm 36 in the center of the cathode top shield plate 37. The top shield plate 37 is electrically isolated from the diaphragm 36 and cathode 34 by means of insulators 38, 39.

The provision of this vacuum capacitor 33 within the chamber leads to greater power transfer. It reduces cathode shield capacitance by reducing the area between electrode and ground. It minimizes r. f. connections and reduces component size. The cathode supports can be simplified because the r. f. connection is independent. Finally, cathode removal is simplified.

As noted above a matching network is provided in association with an r. f. sputter coating apparatus to assure maximum power transfer from the r. f. generator to the load. However, during operation of the apparatus the reflected power tends to increase in value, due to changes in impedance of the apparatus. These changes may be caused by several factors. For example, surfaces in the apparatus that are initially electrical conductors become insulated by the deposition of sputtered dielectric material. This condition necessitates frequent adjustment of the matching network. Accordingly, the desirability of an automatic means for tuning the matching network is apparent.

Previous self tuning networks correct for small changes in the load, after primary manual matching and by using sensors, motors, shafts, gears and other conventional mechanical parts.

In accordance with the teachings of our invention a completely electronic, automatic tuning network is provided to tune out small changes and without using moving parts. The electronic tuning system allows quicker control with greater reliability and attendant packaging advantages.

Figure 7:
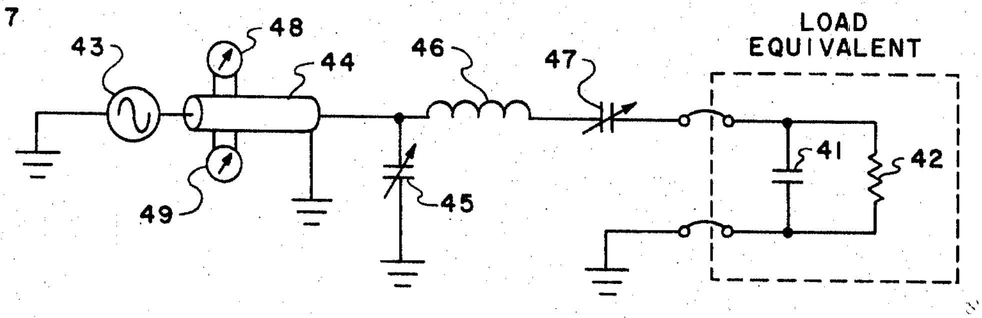
FIG. 7 is a block diagram of a conventional matching network for an r. f. sputter apparatus, with a load equivalent illustrated for the coating apparatus; and, FIG. 8 is a block diagram of an automatic electronic tuning network for an r. f. sputter apparatus in accordance with the teachings of our invention.

Referring first to FIG. 7 a block diagram of a conventional matching network for an r. f. sputter coating apparatus is illustrated. The load equivalent of the r. f. apparatus is shown as including an effective capacitance 41 and an effective resistance 42.

A signal is applied to the load from an r. f. generator 43 via a coaxial line 44 and through a matching network including a variable shunt capacitance 45 and series connected inductance 46 and variable capacitance 47. Forward 48 and reverse 49 or reflect power meters are provided for tuning observation.

Figure 8:
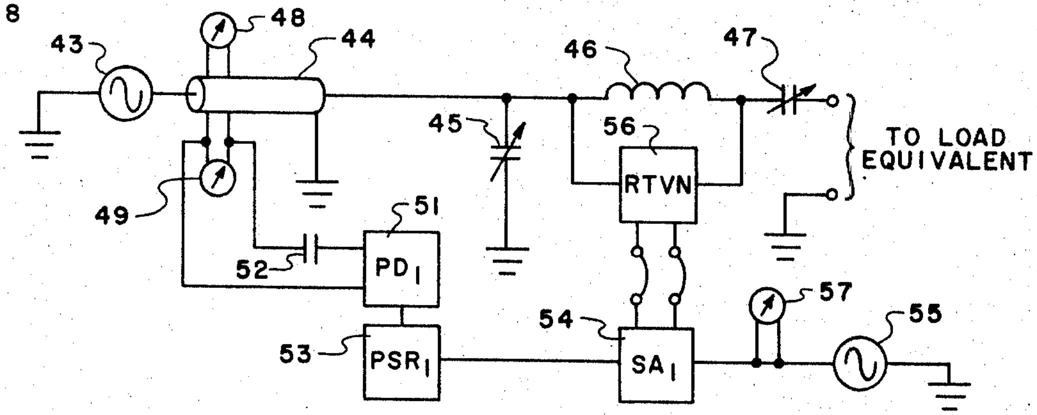

In accordance with our invention, and with reference to FIG. 8, an automatic electronic tuning feature for the conventional matching network shown in FIG. 7 is provided. The reverse or reflected power is coupled to a phase detector 51 via a line capacitor filter 52. The phase detector picks up any phase shift off the coaxial line caused by mismatch and delivers a secondary signal to a polarity sensing responder 53.

The polarity sensing responder 53 responds to inputs from the phase detector 52, and acting on this signal will generate an equal or aid oppose signal to the audio signal input in a summing amplifier 54.

The summing amplifier 54 integrates a signal from the polarity sensing responder 53 against a variable audio input signal from a variable output audio signal generator 55 and control a reactance tube variable network 56. A meter 57 monitors the signal output generator.

Throughout the preceding discussion, the application of our invention to an r. f. sputter apparatus for coating with dielectric materials has been described. The teachings of the invention can be used to advantage in sputtering conductive materials. Thus the target material could be replaced with a target of metal such as chromium, molybdenum and platinum. Referring in particular to FIG. 3 the generator 22 would be a d. c. source for applying a d. c. potential to the shield 20. Effective plasma control and elimination of arcing and sparking can be expected.

Likewise, the teachings of the invention are applicable to sputter etching apparatus. In that case the devices to be etched are mounted at the cathode. Less sparking and arcing and more uniform results can be expected.

The reactance tube variable network 56 compensates for load circuit changes during sputtering which appear as actual minor changes in the matching network.

While the invention has been particularly described and shown with reference to the preferred embodiments thereof, it will be understood by those skilled in the art that various changes in form and detail and omissions may be made therein without departing from the spirit and scope of the invention.

What is claimed is:

1. Apparatus for coating an article by sputtering comprising:

a chamber adapted to be evacuated and maintain a low pressure of ionizable gas therein;

an r. f. cathode electrode disposed within said chamber and adapted to have a target of dielectric material mounted thereon;

an r. f. anode electrode disposed within said chamber and adapted to support articles to be coated thereon;

said electrodes adapted to support a glow discharge in a region therebetween upon application of an r.f. signal to said cathode electrode and ensuing ionization of said ionizable gas;

a radio frequency generator for producing a glow discharge in said ionizable gas, electrically connected to said cathode electrode;

said electrodes being so positioned that when said cathode electrode is at a negative potential positive ions from said discharge strike said target to remove material therefrom and deposit same on articles supported on said anode electrode; and means closely spaced to said anode-cathode region for driving said glow discharge positive with respect to said anode electrode potential;

2. The invention defined by claim 1 wherein said shield is electrically isolated from said anode electrode, cathode electrode and chamber.

3. The invention defined by claim 1 wherein said shield is a metal cylinder surrounding said anode-cathode region.

4. The invention defined by claim 4 wherein said shield is apertured.

5. The invention defined by claim 1 including means for applying an r. f. signal to said shield.

6. The invention defined by claim 5 including a variable inductance in parallel with the shield.

7. An r.f. sputter apparatus comprising:

a chamber adapted to be evacuated and maintain a low pressure of ionizable gas therein;

an r.f. cathode electrode disposed within said chamber and adapted to support a glow discharge upon application of an r. f. signal to said cathode electrode and ensuing ionization of said ionizable gas;

a radio frequency generator for producing a glow discharge in said ionizable gas, electrically connected to said cathode electrode; and, means closely spaced to said glow discharge for driving the potential of said discharge positive, said glow discharge driving means comprising a shield surrounding said glow discharge.

8. The invention defined by claim 7 wherein said glow discharge driving means is electrically isolated from said cathode electrode and chamber.

9. The invention defined by claim 7 including an electrical source connected to said shield.

10. The invention defined by claim 9 wherein said electrical source means is an r. f. generator.

11. The invention defined by claim 10 including a variable inductance in parallel with said shield.

12. In an r. f. sputtering apparatus, an r. f. cathode and an r. f. anode spaced from said cathode;

means for creating a glow discharge between said cathode and said anode; and, means surrounding said glow discharge for driving said discharge positive with respect to said anode, said glow discharge driving means comprising a shield.

* * * * *